(12) United States Patent
Deneuve

(10) Patent No.: US 11,339,681 B2
(45) Date of Patent: May 24, 2022

(54) METHOD FOR MONITORING THE OPERATING STATE OF AN OVERPRESSURE VALVE

(71) Applicant: SAFRAN AIRCRAFT ENGINES, Paris (FR)

(72) Inventor: Sébastien Jean Fernand Deneuve, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/276,015

(22) PCT Filed: Sep. 16, 2019

(86) PCT No.: PCT/FR2019/052154
§ 371 (c)(1),
(2) Date: Mar. 12, 2021

(87) PCT Pub. No.: WO2020/053536
PCT Pub. Date: Mar. 19, 2020

(65) Prior Publication Data
US 2022/0034234 A1    Feb. 3, 2022

(30) Foreign Application Priority Data
Sep. 14, 2018  (FR) ...................... 1858308

(51) Int. Cl.
*F01D 19/02* (2006.01)
*F01D 25/18* (2006.01)
*F02C 9/16* (2006.01)

(52) U.S. Cl.
CPC ............ *F01D 19/02* (2013.01); *F01D 25/18* (2013.01); *F02C 9/16* (2013.01); *F05D 2260/80* (2013.01)

(58) Field of Classification Search
CPC .......... F01D 19/02; F01D 25/18; F01D 19/00; F02C 9/16; F05D 2260/80; F01M 11/10;
(Continued)

(56) References Cited

U.S. PATENT DOCUMENTS 2,695,365 A * 11/1954 McLean .................... H02P 9/42
                                                    60/39.47
3,777,479 A * 12/1973 Hagen ...................... F02C 9/54
                                                    60/242

(Continued)

FOREIGN PATENT DOCUMENTS

| FR | 2 978 211 A1 | 1/2013 |
| FR | 2 980 237 A1 | 3/2013 |
| FR | 2 987 398 A1 | 8/2013 |

OTHER PUBLICATIONS

French Search Report for French Application No. 1858308, dated May 17, 2019.
(Continued)

*Primary Examiner* — Hoang M Nguyen
(74) *Attorney, Agent, or Firm* — Birch, Stewart, Kolasch & Birch, LLP

(57) ABSTRACT

The invention relates to a method for monitoring the operating state of an overpressure valve of a turbine engine, the turbine engine comprising a fluid circuit, at least one pressure sensor for the fluid in the fluid circuit, a temperature sensor for the fluid in the fluid circuit, said overpressure valve being configured to limit the maximum fluid pressures in the fluid circuit, and the method comprising the following steps: —(E2) determining an opening or closing indicator of the overpressure valve on the basis of the change in the fluid pressure over time; —(E3) determining an operating state of the valve as a function of a fluid threshold temperature and of the determined opening or closing indicator of the overpressure valve.

12 Claims, 5 Drawing Sheets

(58) Field of Classification Search
CPC ............ F16N 2210/02; F16N 2250/04; F16N 2250/08; Y02T 50/60
USPC .................................................. 60/39.1, 772
See application file for complete search history.

(56) References Cited

U.S. PATENT DOCUMENTS

| | | | |
|---|---|---|---|
| 2003/0012700 A1* | 1/2003 | Carnahan | B01J 19/0046 422/400 |
| 2013/0019952 A1 | 1/2013 | Andre et al. | |
| 2013/0226395 A1 | 8/2013 | Bense et al. | |
| 2013/0284123 A1* | 10/2013 | Foege | F17C 9/04 62/48.1 |
| 2021/0355877 A1* | 11/2021 | Yeung | F01D 25/305 |
| 2021/0381451 A1* | 12/2021 | Rollinger | F02B 21/00 |

OTHER PUBLICATIONS

International Preliminary Report on Patentability and Written Opinion of the International Searching Authority (Forms PCT/ISA/210, PCT/ISA/220, and PCT/ISA/237) for International Application No. PCT/FR2019/052154, dated Jan. 23, 2020.

* cited by examiner

Oil pressure during cold start

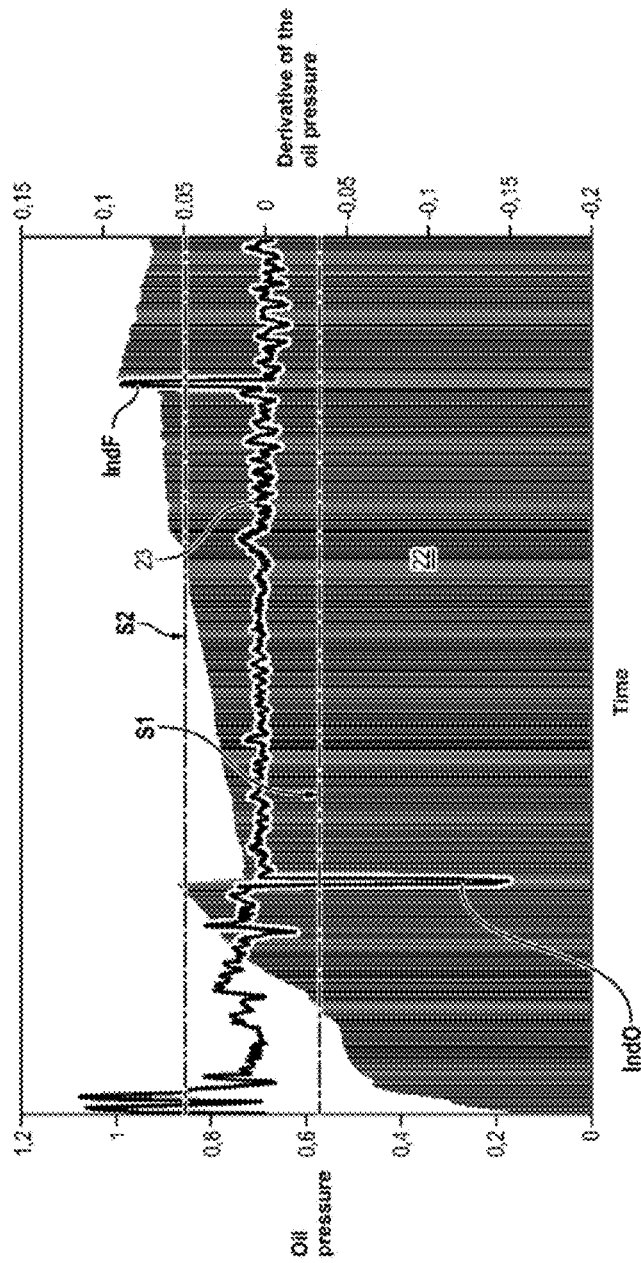

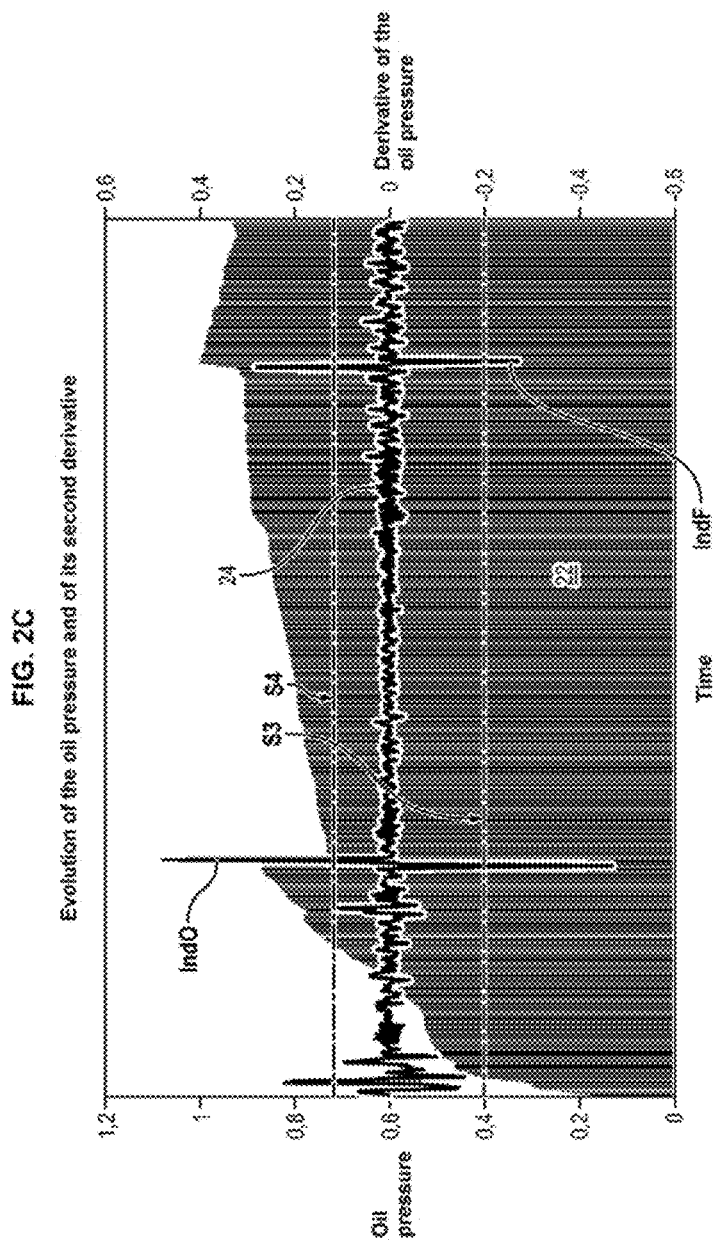

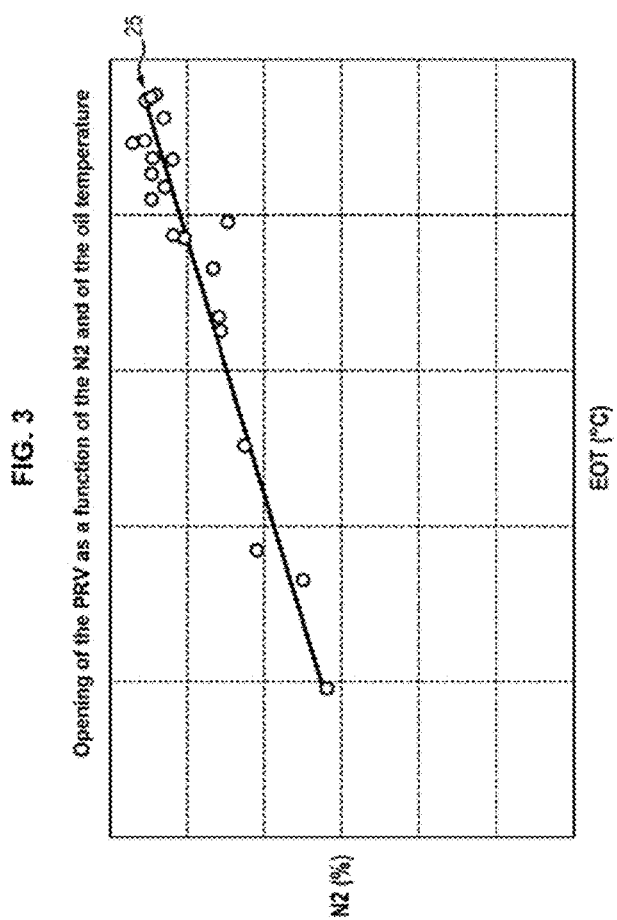

METHOD FOR MONITORING THE OPERATING STATE OF AN OVERPRESSURE VALVE

FIELD OF THE INVENTION

The invention concerns a method for monitoring the operating state of a pressure relief valve.

This method is particularly intended to be implemented for a turbomachine pressure relief valve, said valve being configured to limit the maximum oil pressures in an oil circuit of the turbomachine.

STATE OF THE ART

A turbomachine for an aircraft generally comprises, from upstream to downstream in the direction of the gas flow, a fan, one or more stages of compressors, for example a low-pressure compressor and a high-pressure compressor, a combustion chamber, one or more stages of turbines, for example a high-pressure turbine and a low-pressure turbine and a gas exhaust nozzle.

A turbine may correspond to each compressor, the two being connected by a shaft, thus forming, for example, a high-pressure body and a low-pressure body. It generally has, on the one hand, substantially at the upstream end of the high-pressure body, an "upstream enclosure" and, on the other hand, substantially at the downstream end of the high-pressure body, a "downstream enclosure", these two enclosures containing bearing and gear type members driven by one of the shafts of the high-pressure or low-pressure bodies.

These enclosures are bathed in an atmosphere containing oil for the lubrication of these various members. These enclosures as well as accessory boxes for the engine are supplied with lubricating oil by a circuit which includes a tank from which pipes connecting it to the different members to be lubricated extend.

A supply pump ensures the movement of the oil towards these members and pipes recover the oil at their outlet in order to bring it back to the tank. The oil pressure in the circuit results from the pressure given to the discharge of the supply pump, which is linked to the engine speed, and from the size of the jets which are located at the outlet of the enclosure supply pipes.

After passing through the enclosures, the oil is directed towards a group of oil-fuel exchangers to be cooled before returning to the tank.

The oil system of a turbojet engine includes many actuators and sensors to perform the two main functions of this system: lubricating the engine and maintaining the oil temperature at an acceptable level.

In order to protect the elements of the oil circuit from maximum oil pressures, a Pressure Relief Valve (PRV) is present in the circuit. This valve is therefore supposed to open only at two times (which correspond to the two cases where an overpressure in the circuit can occur):
  in case of fault in the oil circuit;
  in case of start-up with very cold oil.

Thus, this pressure relief valve opens in order to limit the maximum oil pressures in the circuit to protect the other pieces of equipment of the circuit in case of high-pressure. A fault in this pressure relief valve makes the overpressure protection function inoperative which, effectively, can lead to an engine failure leading to flight cancellation if an overpressure occurs on the ground, or to an involuntary shutdown of the engine if a overpressure occurs in flight.

It is known to use a strategy of acoustic monitoring of the pressure relief valve through the acquisition of the oil temperature at the inlet and outlet of the pressure relief valve and through an ultrasonic measurement of the flow at the outlet of the pressure relief valve. A leak is then detected if an abnormal variation in temperature is raised relative to the rise in ambient temperature. This leak is confirmed if the ultrasonic measurement exceeds a certain threshold.

It is also known to use a method for monitoring a hydraulic system using for that purpose a complete physical model based on the physical equations governing the system. This model uses acquisitions linked to the different variable geometries (actuation pressure, control current, etc.) to determine the complete state of the system.

These solutions require placing additional acquisition means, imposing additional constraints on the installation of sensors, in particular in the vicinity of the valve.

In addition, these solutions lead to the installation of specific harnesses for the electrical connections. These solutions therefore result in an unfavorable mass/cost/installation balance.

PRESENTATION OF THE INVENTION

The aim of the invention is to propose a method for monitoring the operating state of a pressure relief valve making it possible to overcome the drawbacks described above.

The aim is achieved within the framework of the present invention through a method for monitoring the operating state of a turbomachine pressure relief valve, the turbomachine comprising a fluid circuit, at least one fluid pressure sensor in the fluid circuit, a fluid temperature sensor in the fluid circuit, said pressure relief valve being configured to limit the maximum fluid pressures in the fluid circuit and to open if the fluid temperature is smaller than a threshold fluid temperature, and the method comprising the following steps:
  determining an indicator of opening or closing of the pressure relief valve from the temporal evolution of the fluid pressure;
  determining an operating state of the valve as a function of a fluid temperature measured by the fluid sensor, of a fluid threshold temperature and of the determined indicator of opening or closing of the pressure relief valve.

Advantageously, said method allows obtaining an indicator of the operating state of the valve without the need to mount a sensor reporting the open or closed state of the pressure relief valve allowing weight gain and minimizing the number of connectors at a calculator of the turbomachine.

Also, said method thus allows implementing a robust way to detect the variations in the behavior of this pressure relief valve, and thus avoid false detections.

Advantageously but optionally, the method according to the invention can further comprise at least one of the following characteristics:
  the step of determining an indicator of opening or closing of the pressure relief valve is carried out as a function of the derivative or of the second derivative of the fluid pressure as a function of time;
  the step of determining an indicator of opening or closing of the pressure relief valve also includes, when said step is carried out as a function of the derivative of the fluid pressure as a function of time, the:

determination of an indicator of opening of the pressure relief valve if a value of the derivative is smaller than a first threshold value, and the determination of an indicator of closing of the pressure relief valve if a value of the derivative is greater than a second threshold value;

the step of determining an indicator of opening or closing of the pressure relief valve also includes, when said step is carried out as a function of the second derivative of the fluid pressure as a function of time, the:

determination of an indicator of opening of the pressure relief valve if a value of the second derivative is smaller than a first threshold value, and greater than a second threshold value, greater than the first value, and the determination of an indicator of closing of the pressure relief valve if a value of the second derivative is smaller than the first threshold value, and greater than a second threshold value;

the fluid circuit is an oil circuit and the pressure relief valve is configured to limit the maximum oil pressures in the oil circuit of the turbomachine;

the step of determining an operating state of the pressure relief valve also includes the following sub-steps:

determining an abnormal operating state of the pressure relief valve if an opening indicator has been determined and if the temperature of the fluid at a time corresponding to the opening indicator is greater than a determined temperature threshold;

the turbomachine comprises an engine rating speed sensor, and in which the method further comprises an initial step of extracting an engine start-up phase as a function of the engine speed, the step of determining an indicator of opening or closing of the pressure relief valve being implemented during said engine start-up phase;

the step of determining an operating state of the pressure relief valve also includes the following sub-steps:

determining an abnormal operating state of the pressure relief valve if during the start-up phase, the temperature is greater than a determined temperature threshold;

the step of determining an operating state of the pressure relief valve also includes the following sub-steps:

detecting a drift in an opening of the pressure relief valve as a function of the engine speed and of the temperature at the opening time, said drift being representative of the first signs of failure of said valve;

the step of detecting a drift is carried out, with reference to a nominal curve as a function of the engine speed and of the temperature at times of opening of the pressure relief valve; and the number of cycles of opening and closing of the pressure relief valve is saved.

The object of the invention is also a computer program product comprising code instructions for the execution of a method for monitoring the operating state of a turbomachine pressure relief valve according to any of the characteristics described above.

DESCRIPTION OF THE FIGURES

Other characteristics, aims and advantages of the present invention will become apparent upon reading the following detailed description, in relation to the appended figures, given by way of non-limiting examples and on which:

FIG. 2B represents an evolution curve of the derivative of the oil pressure during cold start implemented by a monitoring module according to the invention;

FIG. 2C represents an evolution curve of the derivative of the oil pressure during cold start implemented by a monitoring module according to the invention;

FIG. 3 represents a curve illustrating the opening of the pressure relief valve as a function of an engine speed and of an oil temperature implemented by a monitoring module according to the invention;

DETAILED DESCRIPTION OF AT LEAST ONE EMBODIMENT OF THE INVENTION

Figure 1:
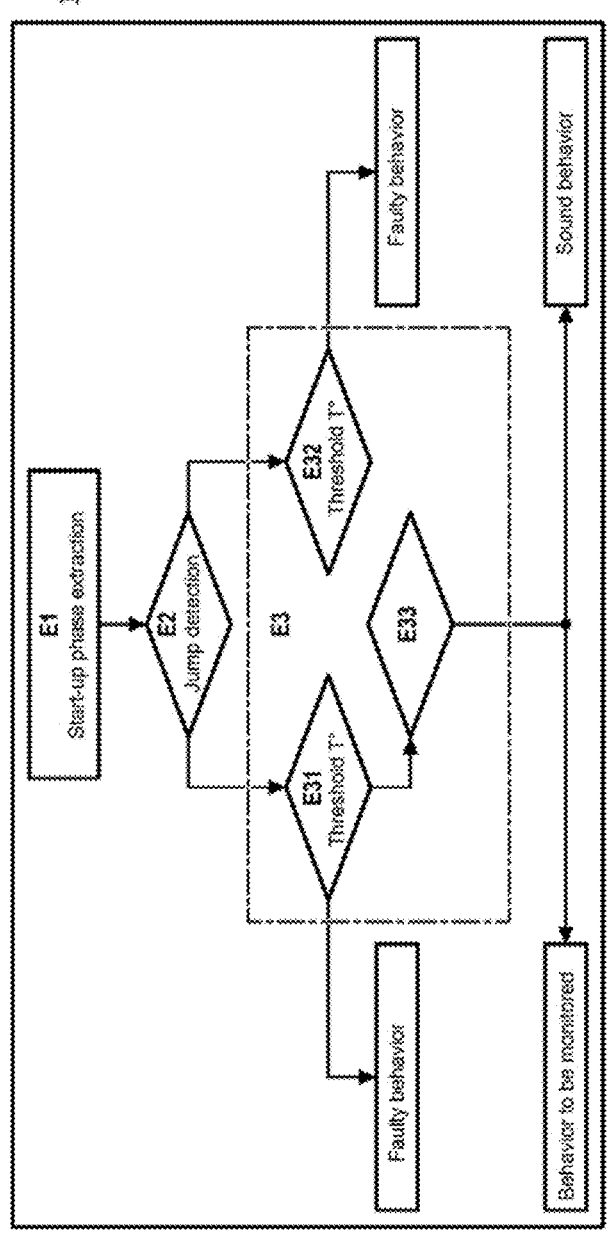
FIG. 1 schematically represents a method for monitoring the operating state of a pressure relief valve according to one embodiment of the invention.

FIG. 1 describes a method for monitoring the operating state of a pressure relief valve implemented by a monitoring module 10.

Advantageously, the aircraft comprises a calculator and the monitoring module 10 can be implemented by said calculator. A calculator comprises, in a known manner, computer means configured to process data and implement computer programs. The calculator can be, for example, the engine calculator of the aircraft which is used to manage information on the operation of the engine(s) of the aircraft.

Particularly, the monitoring module 10 may be able to convert a received analog temperature or pressure measurement into a digital value that can be used, for example, by a processor or by a Field-Programmable Gate Array (FPGA).

In the context where the pressure relief valve is implemented in an oil circuit of an engine of the aircraft, the monitoring module 10 is thus configured to acquire measurements of oil temperature of the circuit, oil pressure of the circuit, as well as speed of the engine for example of the high-pressure (HP) body of said engine.

Advantageously, the sensors allowing the acquisition of such measurements are sensors usually available in the aircraft engine.

As described above, the pressure relief valve is supposed to open in case of start-up with very cold oil in order to limit the maximum oil pressures in the circuit to protect the other pieces of equipment of the circuit in case of high pressure.

Thus, in a step E1 of the method, the monitoring module 10 proceeds with the extraction of the turbomachine engine start-up phase.

For that purpose, the monitoring module 10 proceeds with the acquisition of data derived from the continuous data of the engine in which the values of the oil pressure, of the oil temperature and of the value of the speed of the HP body are extracted on a time basis.

From these data, the monitoring module 10 extracts the start-up phase up to the first acceleration. Indeed, the opening of the pressure relief valve is observed before reaching the idle state of the engine speed and its closing can be done during the first acceleration of the engine.

Figure 2A:
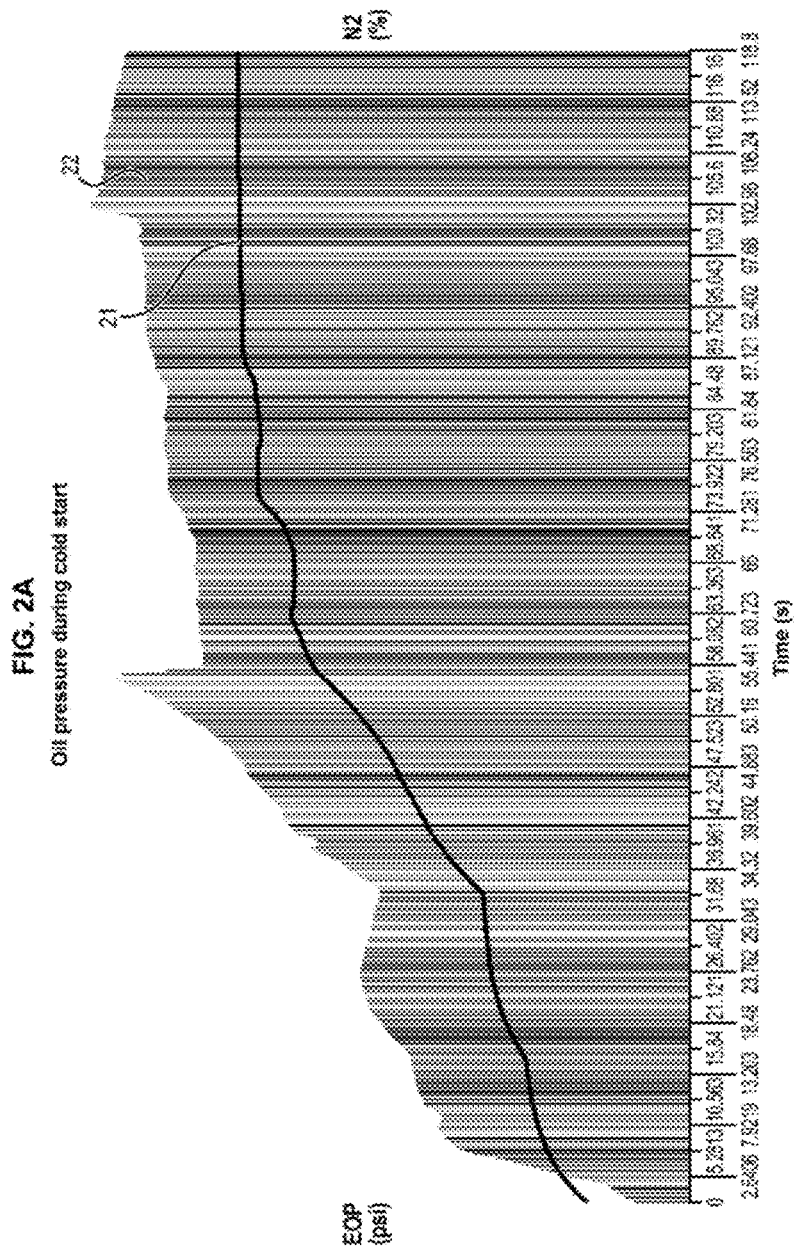
FIG. 2A represents an evolution curve of the oil pressure during cold start implemented by a monitoring module according to the invention.

FIG. 2A illustrates a graph representing the evolution of the oil pressure as a function of time (reference 22), as well as the evolution of the engine speed as a function of time (reference 21).

The engine speed can be used by the monitoring module 10 to determine an engine start-up time in order to consider only certain times for the detection of the opening/closing of the valve.

In a step E2, the monitoring module 10 proceeds with the detection of a jump in oil pressure during the start-up phase extracted in the previous step.

Indeed, a negative jump on the oil pressure is an indicator to detect the opening of the valve and a positive jump for the closing. Normally, the opening leads to a stronger indicator than the closing, it is therefore possible to miss the closing despite the detection of an opening. There are several ways to detect the jump.

Thus, the monitoring module 10 can proceed with the detection of a jump in oil pressure by detecting a significant pressure difference during a given period of time.

Also, as illustrated in FIG. 2B, the monitoring module 10 can proceed with the detection of a jump in oil pressure by determining when the derivative 23 of the oil pressure exceeds a determined threshold.

Thus, if a negative threshold S1 is exceeded by the value of the derivative 23 of the oil pressure, it is an opening of the pressure relief valve (reference Ind0).

If a positive threshold S2 is exceeded by the value of derivative 23 of the oil pressure, it is a closing of the pressure relief valve (reference IndF).

Also, as illustrated in FIG. 2C, the monitoring module 10 can proceed with the detection of a jump in oil pressure by determining when the second derivative 24 of the oil pressure exceeds a certain positive S4 and negative S3 threshold.

If the negative threshold S3 is exceeded before the positive threshold S4, it is an opening of the pressure relief valve (reference Ind0). Otherwise, in the opposite case, it is a closing of the pressure relief valve (reference IndF).

The setting of the thresholds is performed on a case-by-case basis as a function of the dimensioning of the oil circuit. It can be envisaged that this threshold evolves as a function of the motor behavior represented by the evolution of the speed of the HP body.

In a step E3, the monitoring module 10 proceeds with the determination of an operating state of the valve as a function of a threshold fluid temperature.

Thus, in a step E31, sub-step of E3, in case where a jump in oil pressure has been detected in step E2, the monitoring module 10 proceeds with a test on the oil temperature.

Indeed, the pressure relief valve is supposed to open in case of cold start (with a very cold oil temperature).

Thus, if the monitoring module 10 detects an opening of the pressure relief valve while the oil temperature recorded during the opening exceeds a determined temperature threshold (corresponding to a cold oil temperature for a start-up phase), this results in a fault in the equipment.

In this case, the monitoring module 10 can report a fault in the pressure relief valve.

The setting of this threshold on the oil temperature will be performed on a case-by-case basis as a function of the dimensioning of the oil circuit.

In a step E32, sub-step of E3, in case where a jump in oil pressure has not been detected in step E2, the monitoring module 10 can also proceed with a test on the oil temperature.

Indeed, the pressure relief valve is supposed to open in case of cold start, thus if the oil temperature is below a determined temperature threshold (corresponding to a cold oil temperature for a start-up phase) and an opening of the pressure relief valve is not detected during the start-up phase, this also results in a fault in the equipment.

In this case, the monitoring module 10 can report a fault in the pressure relief valve.

Also, the setting of this threshold on the oil temperature can be performed on a case-by-case basis as a function of the dimensioning of the oil circuit.

In a subsequent step E33, sub-step of E3, in case where the pressure relief valve is not detected as faulty (and where an opening event has been detected), the monitoring module 10 can determine a drift in the valve opening time.

Indeed, a link can be found between the engine speed where the pressure relief valve opens and the corresponding oil temperature. It is therefore possible to follow the evolution of this link so that in case of drift, maintenance actions are launched in advance of the phase. The link between engine speed and opening of the pressure relief valve depends on the oil circuit. The identification of the relationship between these two quantities is therefore to be performed on a case-by-case basis.

Such a relationship 25 is illustrated by FIG. 3 which represents the opening of the pressure relief valve as a function of the engine speed (N2) and of the oil temperature (EOT).

Thus, if the engine speed and/or the oil temperature where the pressure relief valve opens is far from the nominal conditions of engine speed and oil temperature where the pressure relief valve should normally open, the monitoring module 10 can report a behavior to be monitored of said valve. Otherwise, the pressure relief valve is reported as having a sound behavior.

Advantageously, the monitoring module 10 can also comprise a pressure relief valve usage counter saving the number of opening and closing cycles detected to anticipate the maintenance of the pieces of equipment having carried out many cycles.

It is known to use solutions performed via damage counters which count the number of cycles carried out by these valves (number of opening and closing). These counters therefore allow knowing the statistical state of these actuators (number of theoretically performed opening and closing) without considering the actual state of the flap, unlike the proposed method.

Indeed, these counters absolutely do not verify that the function that the actuator is supposed to operate is performed, but are based on the "ideal" thresholds at which the actuator is supposed to close.

The proposed monitoring method and module therefore allow the monitoring of the valve, for example of the discharge bypass flap type in the oil circuit of a turbojet engine from a functional point while making sure that the role required of the valve is still well performed. Thus, the monitoring described here allows monitoring the state of the valve according to two aspects:

a functional monitoring which allows making sure that the function is still performed and that it does not deviate from the expected specifications (opening and closing times, minimum and maximum opening pressure values); and a usage counter which counts the number of opening and closing cycles actually performed by the equipment.

One of the difficulties in carrying out the proposed monitoring method and module is to determine a notable signature of the opening of the valve in the acquisitions available.

Indeed, this valve is rarely activated and the oil pressure variations are numerous, which could lead to false detections of pressure relief valve opening.

In addition, the actuation of this valve is rare, the construction of a monitoring indicator for this valve has therefore been complicated by the lack of available data, which requires a robust detection method.

In addition, the sensors available on the oil circuit are not located in the vicinity of the pressure relief valve, the measurements they return are therefore not directly transposable to the physical quantities encountered in the vicinity of the actuator. A robust way to detect the variations in the behavior of this actuator is therefore necessary so as not to have too many false detections.

Advantageously, the proposed method allows having an indicator of the state of the valve without the need to mount a sensor reporting the open or closed state of the pressure relief valve, allowing weight gain and minimizing the number of connectors at the computer.

The invention claimed is:

1. A method for monitoring the operating state of a turbomachine pressure relief valve, the turbomachine comprising a fluid circuit, at least one fluid pressure sensor in the fluid circuit, a fluid temperature sensor in the fluid circuit, said pressure relief valve being configured to limit the maximum fluid pressures in the fluid circuit and to open if the fluid temperature is smaller than a threshold fluid temperature, the method comprising the following steps:
   determining an indicator of opening or closing of the pressure relief valve from the temporal evolution of the fluid pressure;
   determining an operating state of the valve as a function of a fluid temperature measured by the fluid sensor, of a fluid threshold temperature and of the determined indicator of opening or closing of the pressure relief valve.

2. The method for monitoring the operating state of a turbomachine pressure relief valve according to claim 1, wherein the step of determining an indicator of opening or closing of the pressure relief valve is carried out as a function of the derivative or of the second derivative of the fluid pressure as a function of time.

3. The method for monitoring the operating state of a turbomachine pressure relief valve according to claim 2, wherein the step of determining an indicator of opening or closing of the pressure relief valve carried out as a function of the derivative of the fluid pressure as a function of time, also includes the:
   determination of an indicator of opening of the pressure relief valve if a value of the derivative is smaller than a first threshold value, and the
   determination of an indicator of closing of the pressure relief valve if a value of the derivative is greater than a second threshold value.

4. The method for monitoring the operating state of a turbomachine pressure relief valve according to claim 2, wherein the step of determining an indicator of opening or closing of the pressure relief valve is carried out as a function of the second derivative of the fluid pressure as a function of time, said step also includes the:
   determination of an indicator of opening of the pressure relief valve if a value of the second derivative is smaller than a first threshold value, and greater than a second threshold value, greater than the first value, and the
   determination of an indicator of closing of the pressure relief valve if a value of the second derivative is smaller than the first threshold value, and greater than a second threshold value.

5. The method for monitoring the operating state of a turbomachine pressure relief valve according to claim 1, wherein the fluid circuit is an oil circuit and wherein the pressure relief valve is configured to limit the maximum oil pressures in the oil circuit of the turbomachine.

6. The method for monitoring the operating state of a turbomachine pressure relief valve according to claim 1, wherein the step of determining an operating state of the pressure relief valve also includes the following sub-steps:
   determining an abnormal operating state of the pressure relief valve if an opening indicator has been determined and if the temperature of the fluid at a time corresponding to the opening indicator is greater than a determined temperature threshold.

7. The method for monitoring the operating state of a turbomachine pressure relief valve according to claim 1, wherein the turbomachine comprises an engine rating speed sensor, and wherein the method further comprises an initial step of extracting an engine start-up phase as a function of the engine speed, the step of determining an indicator of opening or closing of the pressure relief valve being implemented during said engine start-up phase.

8. The method for monitoring the operating state of a turbomachine pressure relief valve according to claim 7, wherein the step of determining an operating state of the pressure relief valve also includes the following sub-steps:
   determining an abnormal operating state of the pressure relief valve if during the start-up phase, the temperature is greater than a determined temperature threshold.

9. The method for monitoring the operating state of a turbomachine pressure relief valve according to claim 7, wherein the step of determining an operating state of the pressure relief valve also includes the following sub-steps:
   detecting a drift in an opening of the pressure relief valve as a function of the engine speed and of the temperature at the opening time, said drift being representative of the first signs of failure of said valve.

10. The method for monitoring the operating state of a turbomachine pressure relief valve according to claim 9 wherein the step of detecting a drift is carried out, with reference to a nominal curve as a function of the engine speed and of the temperature at times of opening of the pressure relief valve.

11. The method for monitoring the operating state of a turbomachine pressure relief valve according to claim 1, wherein the number of cycles of opening and closing of the pressure relief valve is saved.

12. A computer program product comprising code instructions for the execution of a method for monitoring the operating state of a turbomachine pressure relief valve according to claim 1.

* * * * *